3,452,114
PRODUCTION OF ACETYLENE BY INCOMPLETE COMBUSTION OF HYDROCARBONS WITH OXYGEN
Hans Friz and Franz Neumayr, Ludwigshafen (Rhine), Martin Reichert and Walter Teltschik, Frankenthal, and Ulrich Wagner, Limburgerhof, Germany, assignors to Badische Anilin- & Soda-Fabrik Aktiengesellschaft, Ludwigshafen (Rhine), Germany
No Drawing. Filed Apr. 12, 1967, Ser. No. 630,227
Claims priority, application Germany, Apr. 22, 1966, B 86,776
Int. Cl. C07c 11/24
U.S. Cl. 260—679    2 Claims

ABSTRACT OF THE DISCLOSURE

An improved process fro the production of acetylene by incomplete combustion of gaseous or vaporized hydrocarbons with oxygen and quenching of the cracked gas. The improvement consists in adding carbon dioxide to the hydrocarbons, to the oxygen or to the mixture of hydrocarbons and oxygen before the reaction in an amount of about 10 to 50% by volume with reference to the oxygen reactant.

---

This invention relates to an improved process for the production of acetylene by incomplete combustion of hydracarbons with oxygen.

It is known that acetylene can be produced by incomplete combustion of gaseous or vaporized hydrocarbons with oxygen. This is effected by reacting a hot intimate mixture of the hydrocarbons and the oxygen in a flame reaction. The resultant cracked gas, which contains carbon black, is quenched on leaving the reaction chamber by means of water or high-boiling aromatic hydrocarbons. As a result of this measure, the greater part of the carbon black is suspended in the quenching liquid. Processing of this suspension in order to remove the carbon black is very troublesome, since the amount of carbon black formed in the incomplete combustion of the hydrocarbons is very large; for example, when light naphtha is used as starting material the amount of carbon black formed is of the order of 50 kg. or more per metric ton of hydrocarbons employed.

It is an object of this invention to provide an improved process for the production of acetylene by incomplete combustion of gaseous or vaporized hydrocarbons with oxygen in which less carbon black is formed. Another object of this invention is to provide a process in which higher yields of acetylene are obtained.

These objects are achieved by adding carbon dioxide to the hydrocarbons, to the oxygen or to the mixture of hydrocarbons and oxygen prior to the reaction. The carbon dioxide is advantageously added in an amount of from 10 to 50% by volume with reference to the amount of oxygen which is being reacted.

The invention is further illustrated by the following examples.

EXAMPLE 1

60 m.$^3$ (S.T.P.) per hour of light naphtha (boiling range 38 to 117° C., density of liquid at 20° C. 0.671 kg./l., density of vapor 4.05 kg./m.$^3$ (S.T.P.), content of aromatics 1.99% by volume) and 160 m. (S.T.P.) per hour of oxygen (purity above 99%) are separately heated to 270° C. and introduced into an experimental burner having a capacity of 2 metric tons per day of acetylene. The cracked gas obtained is quenched to 75° C. by injecting 12.8 m.$^3$ per hour of water. Part of the gas is analyzed, the rest is flare-burned. Analysis is carried out by means of an Orsat apparatus and a gas-chromatographic column according to Janak-Lehrer. To determine the amount of carbon black formed a small amount of cracked gas is passed through a glass tube filled with quartz wool and then measured in a gas meter. The tube is dried and the amount of carbon black caught is determined as the difference in weight. Moreover, part of the quenching water is collected and the carbon black contained in it is filtered off, dried and weighed. The total amount of carbon black formed is the sum of the amounts contained in the cracked gas and in the quenching water; it is indicated in g./m.$^3$ (S.T.P.). The results of this experiment are given in column 1(a) of Table 1. In column 1(b) the results of another experiment are specified, in which 50 m.$^3$ (S.T.P.) per hour of carbon dioxide was added to the oxygen before it entered the heater. It can be seen that owing to this measure the amount of carbon black formed was reduced to about one third, while the yield of acetylene rose by 12%. Of the 50 m.$^3$ (S.T.P.) per hour of carbon dioxide supplied only 20 m.$^3$ (S.T.P.) per hour passed into the cracked gas, while the remainder was converted in the reaction into other chemically useful products, particularly CO and $CH_4$

TABLE 1

| | Experiment 1(a) | Experiment 1(b) |
|---|---|---|
| Amount of dry cracked gas in m.$^3$ (STP) per hour | 545 | 575 |
| Composition of cracked gas in percent by volume: | | |
| $O_2$ | 0.1 | 0.2 |
| $N_2$ | 1.4 | 1.2 |
| $H_2$ | 42.9 | 35.2 |
| CO | 38.4 | 38.4 |
| $CO_2$ | 3.7 | 7.1 |
| $CH_4$ | 4.8 | 7.6 |
| $C_2H_2$ | 7.8 | 8.5 |
| Olefins | 0.6 | 1.5 |
| Higher hydrocarbons | 0.3 | 0.3 |
| Amount of carbon black in g./m.$^3$ (STP) of cracked gas | 35.9 | 12.2 |

EXAMPLE 2

Experiments 2(a), 2(b), 3(a) and 3(b) were carried out under the conditions specified in Example 1, but different ratios of light naphtha to oxygen and of oxygen to carbon dioxide were used. The results of the experiments are given in Table 2.

TABLE 2

| | Experiment 2 (a) | (b) | Experiment 3 (a) | (b) |
|---|---|---|---|---|
| Amount of light naptha in m.$^3$ (STP)/h | 75 | 75 | 84 | 84 |
| Amount of $O_2$ in m.$^3$ (STP)/h | 190 | 190 | 210 | 210 |
| Amount of $CO_2$ in m.$^3$ (STP)/h | | 50 | | 26 |
| Amount of dry cracked gas in m.$^3$ (STP)/h | 677 | 738 | 774 | 786 |
| Composition of cracked gas in percent by volume: | | | | |
| $O_2$ | 0 | 0.2 | 0 | 0.2 |
| $N_2$ | 2.0 | 1.5 | 2.1 | 2.1 |
| $H_2$ | 41.7 | 37.8 | 42.7 | 39.3 |
| CO | 38.2 | 38.2 | 38.3 | 39.0 |
| $CO_2$ | 3.2 | 5.0 | 3.8 | 7.0 |
| $CH_4$ | 4.3 | 5.2 | 3.4 | 3.8 |
| $C_2H_2$ | 8.8 | 9.2 | 8.2 | 8.3 |
| Olefins | 1.0 | 1.0 | 0.3 | 0.5 |
| Higher hydrocarbons | 0.3 | 0.3 | 0.3 | 0.3 |
| Amount of carbon black in g./m.$^3$ (STP) of cracked gas | 28.9 | 14.9 | 36.3 | 22.0 |

These experiments show that, with a practically constant CO content in the cracked gas, the carbon black content in the cracked gas is greatly reduced even if the amount of $CO_2$ added to the reactants in Experiment 1(b) is decreased. In experiment 2(b) the reduction in the amount of carbon black is 48% of the amount of carbon black which is formed if no $CO_2$ is added, while the yield of acetylene is increased by 14%. Even in experiment 3(b), in which the amount of $CO_2$ added (in percent by volume) is only about one tenth of the amount of oxygen used, the reduction in the carbon black content is as high as 39%, the increase in the yield of acetylene being nearly 3%.

We claim:
1. In a process for the production of acetylene by incomplete combustion of gaseous or vaporized hydrocarbons with oxygen and quenching of the cracked gas thus obtained, the improvement which comprises adding carbon dioxide to the hydrocarbon reactant or to the oxygen or to the mixture of hydrocarbon and oxygen prior to the reaction in an amount of 10 to 50% by volume with reference to the amount of oxygen being reacted.

2. A process as claimed in claim 1 wherein the hydrocarbon being reacted is a light naphtha.

References Cited

UNITED STATES PATENTS 2,764,555  10/1956  Rees et al. _____ 260—679
3,055,957  10/1962  Braconier et al. ____ 260—679

DELBERT E. GANTZ, *Primary Examiner.*

J. D. MYERS, *Assistant Examiner.*